(12) United States Patent
Garth

(10) Patent No.: US 6,173,725 B1
(45) Date of Patent: Jan. 16, 2001

(54) CANOPY STRUCTURE

(76) Inventor: Geoffrey C. Garth, 34 57th Pl., Long Beach, CA (US) 90803

(*) Notice: Under 35 U.S.C. 154(b), the term of this patent shall be extended for 0 days.

(21) Appl. No.: 09/232,254

(22) Filed: Jan. 19, 1999

(51) Int. Cl.$^7$ .................................................. E04H 15/58
(52) U.S. Cl. ..................... 135/87; 135/88.04; 135/117; 135/155; 135/125; 297/184.1; 248/160; 280/47.371; 280/47.38
(58) Field of Search ..................... 135/87, 88.01, 135/88.04, 155, 117, 114, 125, 126; 297/184.1, 184.16, 184.13; 5/418; 248/104, 106, 160; 280/47.38, 47.371

(56) References Cited

U.S. PATENT DOCUMENTS

| | | | |
|---|---|---|---|
| 597,845 | * 1/1898 | Goodwin | 135/88.04 |
| 2,615,459 | * 10/1952 | Adams | 135/117 X |
| 4,037,614 | * 7/1977 | Hines et al. | 135/126 X |
| 4,865,380 | * 9/1989 | Heitzman-Powell et al. | 297/184.1 |
| 5,033,528 | * 7/1991 | Volcani | 248/126 X |
| 5,301,975 | * 4/1994 | Rivera | 297/184.15 X |
| 5,301,999 | * 4/1994 | Thompson et al. | 297/184.13 |
| 5,397,268 | * 3/1995 | Chang et al. | 297/184.1 X |
| 5,758,889 | * 6/1998 | Ledakis | 280/47.38 |
| 6,014,837 | * 1/2000 | Morgan | 135/125 X |

* cited by examiner

*Primary Examiner*—Carl D. Friedman
*Assistant Examiner*—Winnie Yip
(74) *Attorney, Agent, or Firm*—Allen A. Dicke, Jr.

(57) ABSTRACT

A canopy is formed of an oval flexible sheet of solar radiation and wind resistant material held in extended position by a resilient band and sized so that the band and sheet material are pulled into a saddle shape. Support for the canopy is provided by two flexible supports attached to the canopy at its edges and to a base structure, such as a wheel chair, stroller, patio rail or lawn chair. The supports are long enough so that the canopy can be adjusted to various positions above and alongside the occupant of the base structure for overhead and lateral shelter. The supports are nonresilient and are stiff enough to hold the canopy in the selected position into which it is placed.

9 Claims, 2 Drawing Sheets

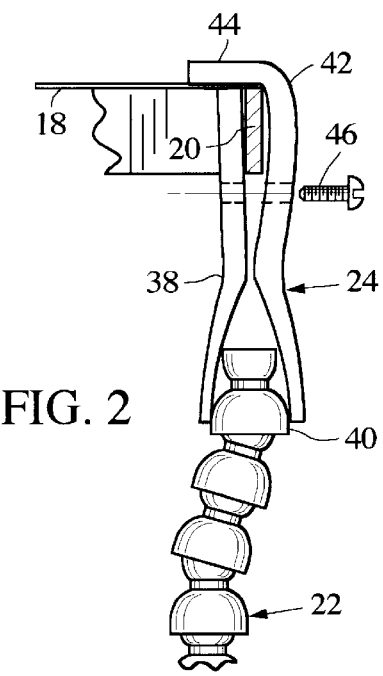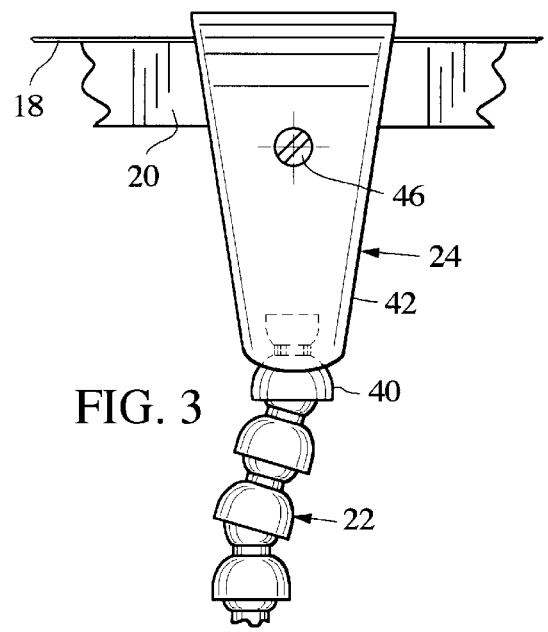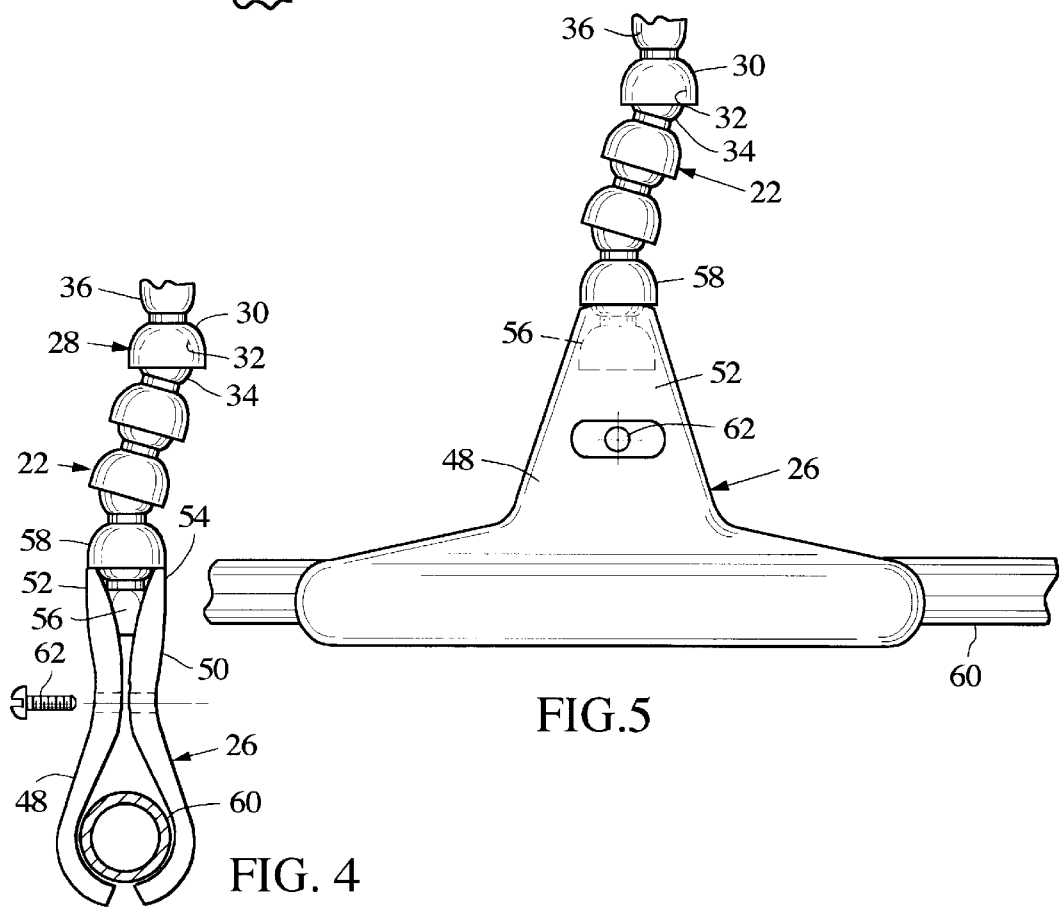

CANOPY STRUCTURE

FIELD OF THE INVENTION

This invention is directed to a canopy structure which has a canopy to provide sun and/or wind shade in a particular selected area. The support for the canopy is adjustable to permit selected movement of the canopy to provide the shade in the desired area. The support permits mounting of the canopy on children's strollers and carriages, as well as wheelchairs. The canopy structure is also configured to mount on various bases like fixed mounts such as beach and garden chairs as well as on porch or patio rails.

BACKGROUND OF THE INVENTION

It is well known that, when persons are outdoors and exposed to solar radiation, there are health risks. Excess solar radiation over a long period increases the chances of skin cancer. Excess solar radiation over a short period causes burning of the skin. In serious cases, one or more layers of skin peel away. The harmful solar radiation incident at the earth's surface is increasing.

It is necessary to shade those persons outdoors from excessive solar radiation. Adults often wear clothing and hats for this purpose. In addition, there are umbrellas and parasols. Children's strollers often have panels which are hinged to the stroller side rails. Such panels have several difficulties which prevent convenient use. They are movable from a raised position to a folded position and are not significantly adjustable for different sun angles. Another problem is that the person driving the stroller (usually the mother) wants to see the infant (usually her child) in the stroller. The present stroller panels cut off this view when raised.

Shelter from the wind is also needed to protect infants in child seats or strollers as well as protect others seated in open windy places.

SUMMARY OF THE INVENTION

In order to aid in the understanding of this invention, it can be stated in essentially summary form that it is directed to a canopy structure which is supportable on a base such as a stroller or some other base structure by means of two flexible supports attached both to the canopy and the base. The canopy is preferably a flexible sheet of polymer fabric of oval configuration, which is stretched by a resilient band at its edges. The supports grasp the edges of the canopy and can grasp two other base members.

It is, thus, a purpose and advantage of this invention to provide a canopy which is supported by two flexible supports so that the canopy can be positioned in the most effective way to achieve both shade or wind shelter of the desired space and view of the shaded space.

It is another purpose and advantage of this invention to provide the aforementioned shade and wind canopy without overly limiting the ability of the child to have a visual field of significant scope to allow the child the satisfaction of one of the reasons for taking the child on walks.

It is another purpose and advantage of this invention to provide a canopy which can be folded into substantially one-third of its open area by employing a flexible canopy sheet and a resilient band in the edges thereof which can be folded upon itself into three loops.

It is another purpose and advantage of this invention to provide two flexible supports supporting the canopy with respect to the base which are sufficiently long so the canopy can be brought down to the side of the base to shelter the base from lateral sun or wind and permit visibility from above.

It is a further purpose and advantage of this invention to provide two flexible supports for the canopy wherein the two flexible supports are each formed of ball tube to achieve adequate support for the canopy together with a wide choice of canopy positioning.

It is a further purpose and advantage of this invention to provide a canopy which can be employed on a number of different base structures, particularly including children's strollers, beach chairs and the like.

It is a further purpose and advantage of this invention to provide a canopy structure which is inexpensive to manufacture so that it can be used widely, and so that it can be easily and conveniently utilized.

Other purposes and advantages of this invention will become apparent from a study of the following portion of the specification, the claims and the attached drawings.

BRIEF DESCRIPTION OF THE DRAWINGS

FIG. 2 is an enlarged view of the upper clamp showing the manner in which the support is attached to the canopy and the ball tube, as seen along the length of the resilient band of the canopy.

FIG. 3 is a front view thereof.

FIG. 4 is a view of one of the lower clamps where the ball tube is attached to a support rod, as seen along the length of the support rod.

FIG. 5 is a side view thereof.

DESCRIPTION OF THE PREFERRED EMBODIMENTS

Figure 1:
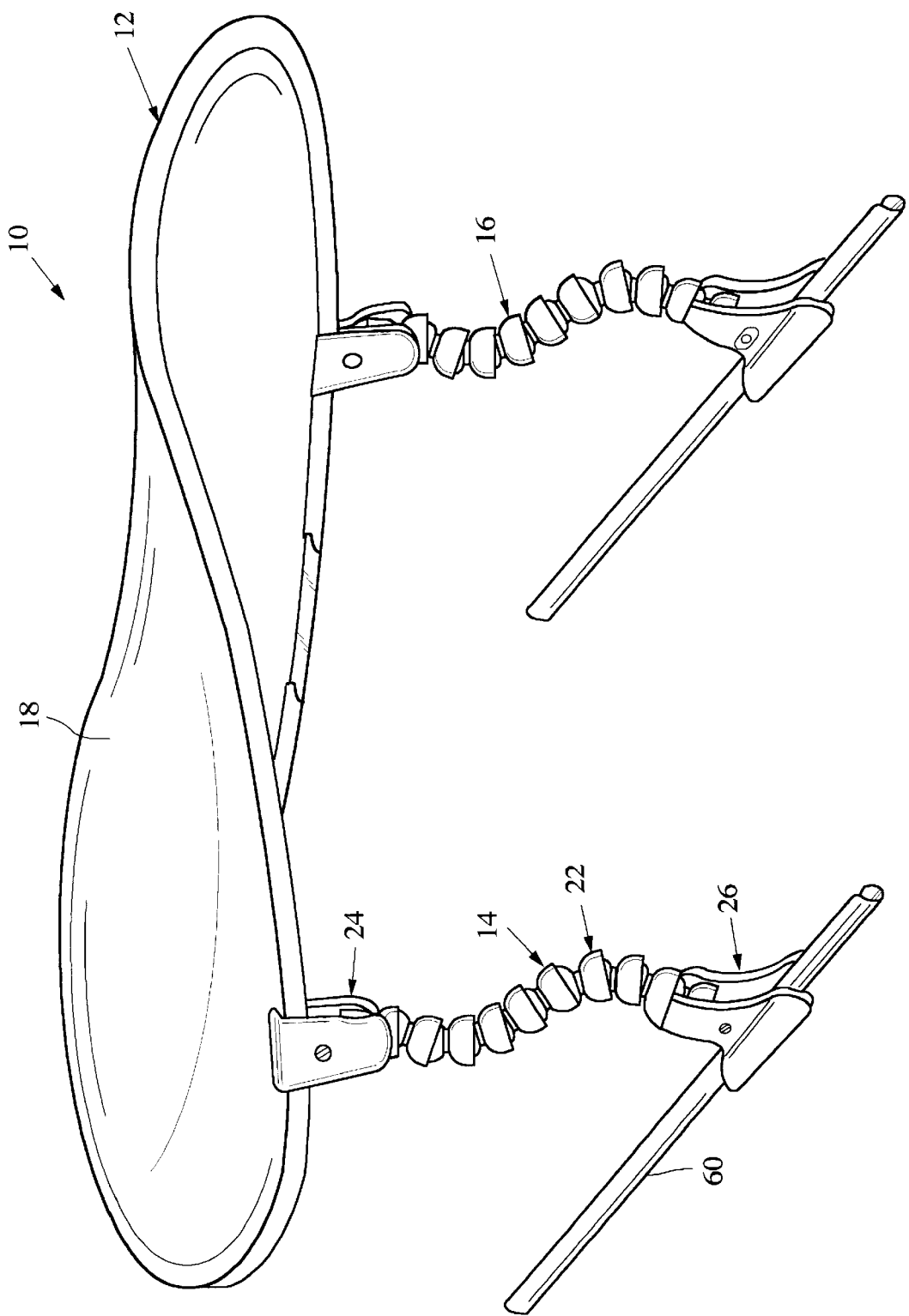
FIG. 1 is a perspective view of the canopy structure of this invention, including its the canopy and its support.

The canopy structure of this invention is generally indicated at 10 in FIG. 1. The canopy structure 10 is comprised of a canopy 12 and a support formed of first and second flexible supports 14 and 16.

The canopy 12 is formed of an oval piece of flexible sheet 18. The oval piece may be elliptical with the minor axis being about three-fourths of the major axis of the ellipse. The flexible sheet may be a film of synthetic polymer composition material or may be a fabric. In either case, it is substantially resistant to transmission of solar radiation. Band 20 (see FIGS. 2 and 3) is an elongated band of substantially rectangular cross section. The band extends all the way around the periphery of the flexible sheet. The band is resilient, may be made of steel, or may be made of hard synthetic polymer composition material of sufficient resiliency and strength for the purpose. The sheet 18 extends outward across the top of the band 20, downward, inward and upward to embrace the band and is secured to itself, such as by sewing, adhesive or self-bonding. The ends of the band 20 are preferably drawn together so that the band 20 is one continuous band, which is circular when unstressed.

It is the size of the sheet 18 as compared to the size of the band 20 that draws the band into the a saddle shaped surface on the sheet 18, as seen in FIG. 1. As a preferred size, the band 20 has a 2" longer length than the circumference of its pocket in the edge of the sheet 18, so that the sheet is forced into the saddle configuration. A particular advantage of using a saddle shape is that the ability of the canopy to resist twisting in the wind is increased, as compared to a planar structure. Another particular advantage of this manner of construction of the canopy structure is that it can be twisted with the proper wrist motion into three substantially concentric loops with an area significantly less than the area of the extended canopy structure. This feature reduces the package size needed for the product to conserve on shipping and storage. This folding is common in the utilization of bandsaw blades and other structures having such a band around the periphery.

As described above, the support is comprised of first and second flexible supports 14 and 16. These flexible supports are of identical construction. Accordingly, only the first flexible support 14 is described in detail and shown in FIGS. 2 through 5. Each flexible support is made up of a ball tube 22, upper clamp 24 and lower clamp 26. The ball tube is formed of a plurality of elements configured so that one snaps into the next to be retained therein. Element 28 has a bell-shaped body 30 with a concave socket 32 therein. The socket is substantially spherical, and the bell body extends below the center line plane of the socket. The ball 34 is formed on the next lower element and is the same size and shape as the ball 36 formed on the element 28.

The configuration is such that the elements are individually molded, preferably of thermoplastic synthetic polymer composition material, and are sized so that the ball of one element can be snapped into and retained in the socket of the next element. In addition to being retained therein, the grip is frictional so that the ball tube in its entirety is flexible, but stiff when not being flexed by the application of force. Of course, the stiffness is a function of design, and the design is chosen to provide the desired stiffness, as described herein. The ball tube 22 is tubular in the sense that each element has a tubular opening therethrough in the axial direction. In the present utilization of the ball tube as a part of the support structure, the tubular configuration is not necessary. It may be employed to conserve materials.

Clamp 24 is configured to clamp on the edge of the canopy. Inner clamp member 38 engages on the inside of the canopy and engages over the ball and against the bell body of element 40. The outer clamp member 42 extends upward outside of the band 20 and has a finger 44 which extends inwardly of the canopy structure over the top of band 20. The lower end of outer clamp member 42 engages on the ball and against the bell body of the element 40. Screw 46 passes through a clearance hole in outer clamp member 42 and engages in threads in inner clamp member 38. When the screw is tightened, the clamp members clamp around the band 20 at the upper end and clamp around the element 40 at the lower end. It is important to note that clamping of the element 40 includes engagement both on its ball and against the outside of the bell body. Other clamp tightening means than screw 46 can be employed in any convenient structure which pulls the clamp members together, including a wing nut on a bolt, or a cam-tightening structure can be employed. Screw 46 is positioned to be directly below band 20 to hold the band up against finger 44. The length of the clamp along the length of band 20 is only sufficient to provide secure clamping without twisting.

Lower clamp 26 also has inner and outer clamp members 48 and 50. At the upper end, the inner and outer clamp members have fingers 52 and 54, which engage around and clamp against the bell body of element 56 as well as engage against the lower shoulder of element 58. At their other end, the inner and outer lower clamp members 48 and 50 grasp around tube 60, which is a part of the base structure on which the canopy structure 10 is supported. The tube 60 may be the side rail of a toddler's stroller or any other convenient support for which canopy shading is required. This includes lawn chairs as well as other similar fixed or movable devices. Since the upper and lower ends of the lower clamp 26 engage upon symmetrical structures, the clamp members 48 and 50 can be identical.

The lower arms of the clamp members 48 and 50 are configured to embrace the tube 60. In order to provide stability to the awning, the clamp members preferably extend a substantial length along the tube 60. The tube 60 is illustrated as being cylindrical, but may be of other shapes. The lower arms of the clamp members 48 and 50 can be configured to embrace and clamp on a wide variety of such structures. Machine screw 62 tightens the two clamp members together to clamp on both the lower end of the ball tube and onto the tube 60. The lower clamp 26 thus secures the canopy with respect to the structure on which it is supported. Other systems of attachment to the base are possible; the described system represents the preferred embodiment. Once secured in place, the canopy structure 12 can be positioned within the limits permitted by the two supports. Other systems of attachment are possible. The system described above is a preferred embodiment. The supports are flexible to permit positioning but are not significantly resilient so the canopy stays in the selected position. Other types of support than ball tubes can be used. Each of the supports is substantially equal or longer than to the distance between the attachments of the supports to the base. This permits the canopy to be moved fully into a side position to protect against lateral wind or sun. By the use of two supports, the canopy can be moved down to either side of the base. The use of two supports of sufficient length enhances positionability.

The application of the canopy to a chair or child's stroller is the preferred utilization. It is also useful supported on other types of movable base structures such as carriages and wheelchairs and fixed base structures such as beach and garden chairs as well as on porch or patio rails. In these various situations, the canopy can be installed so that sun and wind shade can be achieved by positioning the canopy with respect to its base.

This includes lateral and longitudinal positioning, as well as tilting of the canopy structure by bending the two supports into different configurations. The use of two supports provides security for the canopy structure, so that it is held in position when there is wind or vibration, which would tend to apply external forces to the canopy structure. The use of two of the supports provides great security in positioning the canopy structure so that the toddler can still see out. The canopy can be titled forward or to the side when conditions so require, and the mother can still see her toddler in the stroller, and the toddler can see out.

This invention has been described in its presently preferred embodiment, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A canopy structure comprising:
   a canopy formed of a flexible sheet of material which is resistant to the transmission of solar radiation, and a resilient one-piece band of flexible material attached to said flexible sheet adjacent its periphery to define a closed curve which forms the outer edge of said canopy;
   first and second flexible supports, each of said flexible supports having a canopy end and a support end, a canopy attachment device on said canopy end of each of said flexible supports attached to said canopy, and an attachment device on said support end of each of said first and second flexible supports for attaching the support end of said flexible supports to a movable child stroller, said canopy being sized to cross over the movable child stroller, and said first and second flexible supports being elongated and flexible to permit selectively positioning of said canopy to protect a child in the stroller against sun and wind.

2. The canopy structure of claim 1 wherein said closed curve is an oval curve and said flexible sheet of material is in a saddle shape.

3. The canopy structure of claim 1 wherein said one-piece band of flexible material is a continuous closed loop configured so that said canopy can be folded on itself to substantially smaller size than its unfolded area.

4. A canopy structure comprising:

a canopy, said canopy being formed of a flexible sheet of solar radiation and wind resistant material, a resilient continuous band attached to said flexible sheet adjacent its edges, said canopy being sized to protect a person against sun and wind, said flexible sheet of material and said resilient band being sized so that said flexible sheet forms a saddle shaped surface;

first and second flexible supports supporting said canopy, said first and second flexible supports each having an upper end and a lower end;

first and second upper attachment devices respectively on said upper end of said first and second supports and attached to said canopy; and first and second lower attachment devices respectively on said lower end of said first and second flexible supports for attachment to a positionable chair so as to support said canopy in a manner that by flexing said first and second flexible supports said canopy being positioned at various selected positions to include lateral positions with respect to the positionable chair to protect a person in the positionable chair against sun and wind.

5. The canopy structure of claim 4 further includes a child's stroller which said canopy is attached.

6. A canopy structure comprising:

a canopy, said canopy being formed of a flexible sheet of solar radiation and wind resistant material having edges, a resilient continuous band attached to said flexible sheet adjacent its edges, said flexible sheet of material and said resilient band being sized to form a saddle shaped surface with said flexible sheet of solar radiation and wind resistant material as said canopy;

a movable child stroller;

a support structure supporting said canopy, said support structure comprising first and second flexible supports, said first and second flexible supports each being attached to said child stroller and to said canopy so as to support said canopy so that it can be positioned at various selected positions with respect to said child stroller by flexing said first and second flexible supports to protect a child in said child stroller against solar radiation and wind while the stroller and child are moving.

7. The canopy structure of claim 6 wherein said flexible sheet of solar radiation resistant material has a circular peripheral shape and said flexible band adjacent the edge thereof is a continuous band of shorter length than said periphery to form a saddle shaped canopy surface.

8. The canopy structure of claim 6 wherein said first and second flexible supports are of substantially equal length.

9. The canopy structure of claim 7 wherein each of said first and second flexible supports is of the same construction.

* * * * *